(12) United States Patent
Fikouras et al.

(10) Patent No.: US 8,788,682 B2
(45) Date of Patent: Jul. 22, 2014

(54) COMMUNICATION DEVICE, AND METHOD, IN AN INTERNET PROTOCOL NETWORK, OF CONTROLLING A COMMUNICATION DEVICE

(75) Inventors: Ioannis Fikouras, Aachen (DE); Nikolaos Albertos Fikouras, Attiki (GR)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 347 days.

(21) Appl. No.: 12/680,633

(22) PCT Filed: Sep. 28, 2007

(86) PCT No.: PCT/EP2007/060328
§ 371 (c)(1), (2), (4) Date: Mar. 29, 2010

(87) PCT Pub. No.: WO2009/039891
PCT Pub. Date: Apr. 2, 2009

(65) Prior Publication Data
US 2010/0217876 A1    Aug. 26, 2010

(51) Int. Cl.
G06F 15/16    (2006.01)
(52) U.S. Cl.
USPC .......................... 709/228; 709/223; 709/224
(58) Field of Classification Search
USPC .......................... 709/228, 223, 224
See application file for complete search history.

(56) References Cited

U.S. PATENT DOCUMENTS

| | | | | |
|---|---|---|---|---|
| 2002/0141393 | A1* | 10/2002 | Eriksson et al. | 370/352 |
| 2003/0097484 | A1* | 5/2003 | Bahl | 709/313 |
| 2005/0105471 | A1* | 5/2005 | Ido et al. | 370/241 |
| 2005/0243746 | A1* | 11/2005 | Mutikainen et al. | 370/282 |
| 2006/0034290 | A1 | 2/2006 | Kalofonos | |
| 2008/0240091 | A1* | 10/2008 | Kesavan et al. | 370/389 |

FOREIGN PATENT DOCUMENTS

SE    0601381-7    11/2006

OTHER PUBLICATIONS

Ericsson, On the Granularity of Uplink Scheduling in LTE. 3GPP RAN WG2-Ran2 #53. R2-061415. May 8-12, 2006.
3GPP. $3^{rd}$ Generation Partnership Project; Technical Specification Group Radio Access Network; Medium Access Control (MAC) Protocol Specification (Release 7). 3GPP TS 25.321 v7.0.0 (Mar. 2006).
Samsung. EDCH Buffer Status Reporting. 3GPP TSG RAN 2 #45bis. R2-050026. Jan. 10-14, 2005.
QUALCOMM. Scheduling Information Contents. 3GPP TSG RAN WG2 meeting #48. R2-051957. Aug. 29-Sep. 2, 2005.
Siemens. Signalling to Support Node B Scheduling. 3GPP TSG RAN 2 #45bis. R2-050106. Jan. 10-14, 2005.

(Continued)

Primary Examiner — Nicholas Taylor

(57) ABSTRACT

A method of controlling a communication device and a corresponding communication device are described. A communication session with a communication partner is managed using a session level connection identifier for referring to a transport connection used in said communication session, and a link record associating a recorded value of said session level connection identifier with a recorded value of a transport layer connection identifier is kept.

30 Claims, 4 Drawing Sheets

(56) References Cited

OTHER PUBLICATIONS

Nokia. Buffer Reporting for E-UTRAN. 3GPP TSG-RAN WG2 meeting #52. R2-060829, Mar. 27-31, 2006.
Panasonic, et al. UL Scheduling Scheme for LTE. 3GPP TSG RAN WG2 #53. R2-061220. May 8-12, 2006.
3GPP. $3_{rd}$ Generation Partnership Project, Technical Specification Group Radio Access Network; Medium Access Control (MAC) Protocol Specification (Release 6). 3GPP TS 25.321 v6.6.0 (Sep. 2005).
Catt, Ritt. Enhancement to Buffer Status Reporting. 3GPP TSG RAN WG2 #55. R2-062935. Oct. 9-13, 2006.
Motorola. Comparison of UL Buffer Reporting/Scheduling Schemes in LTE. 3GPP TSG-RAN-WG2 LTE Ad Hoc Meeting. Tdoc R2-061915, Jun. 27-30, 2006.
Communication of a Notice of Opposition and Annex. Feb. 2, 2011.
Response to Notice of Opposition. Jun. 29, 2011.
Supporting documents filed in Opposition of EP20030380—submitted Jan. 27, 2011.
Ou, Xun: Yu. Jeffrey; Brent, Richard: "A Mobile TCP Socket" [Online] 1997, pp. 1-6.
Qu X et al; "A mobile TCP socket"Internet Citation. [Online] Apr. 1997.

* cited by examiner

| 201 | 202 | 203 |
|---|---|---|
| conid | Connection handle | Other TCP options |
| ……. | ……. | ………. |
| ……. | ……. | ………. |

200

(a)

| conid | Connection handle | Other TCP options |
|---|---|---|
| ……. | ……. | ………. |
| XXXXX | Handle 1 | ………. |

(b)

| conid | Connection handle | Availa-bility | Owner | Index | Other TCP options |
|---|---|---|---|---|---|
| ……. | ……. | | | | ………. |
| XXXXX | Handle 1 | | | | ………. |

(c)

COMMUNICATION DEVICE, AND METHOD, IN AN INTERNET PROTOCOL NETWORK, OF CONTROLLING A COMMUNICATION DEVICE

TECHNICAL FIELD

The present invention generally relates to the field of communications and specifically to a method of controlling a communication device and a corresponding communication device.

BACKGROUND

In data unit communication, it is known for a communication device acting as a sender to divide a stream of data symbols (e.g. bits or bytes) into data units and send these over an appropriate transmission network to another device acting as a receiver. The receiver reconstructs the data symbol stream on the basis of the received data units.

Usually, this is performed in the context of a layering scheme (such as the OSI scheme), where a sending peer of a given protocol receives a data symbol stream from a higher layer, generates data units in accordance with the given protocol to which the sending peer adheres, and passes the generated data units to lower layers. On the receiving side, the receiving peer receives the data units from the lower layer, reconstructs the data symbol stream, and passes the reconstructed data symbol stream to the higher layer. The concept of dividing a data symbol stream into data units and the concept of layering are well known in the art, such that a further explanation is not necessary here.

It is noted that such sub-divisions of data are referred to by a variety of names, such as packets, segments, frames, protocol data units, service data units, etc. In the context of the present specification and claims, the term "data unit" is used generically to relate to any such sub-divisions of data for the purpose of communication.

A connection-oriented transport protocol such as TCP (Transmission Control Protocol) can be used together with a network layer protocol, for example the Internet Protocol (IP), to establish a transport connection between hosts across a network. Such connection may be identified by a transport connection identifier (also known as a 'virtual circuit identifier') comprising connection endpoint identifiers that are used to identify each endpoint of the connection. For example, in the context of TCP/IP, a connection endpoint identifier includes the IP address and port number associated with a particular host computer and an application running on that computer, respectively.

It is sometimes desirable to use a connection as described above to enable applications to participate in a multimedia session, in which one or more media streams are sent from one application to another. The shortcomings of known session management procedures become evident, however, when one of the connection endpoint identifiers changes. For example, a mobile host participating in a session with a base station may be assigned a new IP address when it moves from the coverage area of the base station to that of another base station.

The IP address change has a number of implications: Primarily, it will force the TCP-based communication to irrecoverably interrupt as the transport connection identifier, which is recorded within a special data block called the Internet Protocol Control Block (InPCB) at each of the session endpoints, will no longer correspond to the status of the session endpoints. Secondly, a failure of the TCP connection will force all data exchanged up to the point of mobility to be lost.

SUMMARY

It is the object of the present specification to provide an improved method of controlling a communication device engaged in a communication session with a communication partner, and a correspondingly improved communication device.

The object of the present invention is achieved by the method and device described in the independent claims. Advantageous embodiments are described in the dependent claims.

In accordance with an embodiment of the present invention, a communication device is configured to perform a procedure for managing a communication session with a communication partner using a session level connection identifier for referring to a transport connection used in the communication session. The communication device is also configured to perform a procedure for keeping a link record that associates a recorded value of the session level connection identifier with a recorded value of a transport layer connection identifier.

In other words, a transport connection between the communication device and its partner that is established and maintained by protocol peers operating on the transport layer (e.g. a TCP connection) is identified at the session level by a new identifier that is used by a session management procedure operating on a higher layer, for example the session or application layer. The term "session level" indicates a control operation with respect to managing the session, which can e.g. be done at the session layer or at the application layer. On the other hand, the transport layer peers handle the connection using a transport layer connection identifier (e.g. in TCP/IP the four-tuple of IP address/port number for the sender and receiver). An association between values of these two distinct identifiers is kept in a link record, which provides the session management procedure with a link to the value of the transport layer connection identifier.

In other words, in the present invention a scheme is introduced for letting a session manager make reference to a transport layer connection with its own reference mechanism, i.e. with a variable or parameter referred to as a session level connection identifier defined within the context of session management, such that this session level connection identifier can assume values independently of the values assigned to transport layer connection identifier used by the transport layer peers. The link record (e.g. a table) associates the values of the session level connection identifiers with the corresponding values of the transport layer connection identifiers. By making it possible for the session manager to refer to a connection independently of the transport layer connection identifier, a new degree of freedom in session control is achieved, and it e.g. becomes possible to change the value of the transport layer connection identifier (e.g. one endpoint address of a TCP/IP address pair) while retaining the same session level connection identifier. Thereby, the session manager can continue to handle the communication as occurring on the same connection, although conditions at the transport layer have changed. Thereby, it is possible to e.g. deal with mobility at the transport layer (e.g. change of IP address of a mobile communication device) on the session management level, without having to modify procedures at the transport layer.

By virtue of this cross-layer concept, in a communication device according to a preferred embodiment of the present invention, a change to a connection between the communication device and a partner device, for example the connection endpoint identifier (e.g. IP address) associated with the partner device, can be communicated in the course of session management along with an associated session level connection identifier. With the use of the link record together with the session level connection identifier, those changes can then be registered by the communication device on the transport layer, thus allowing the session to continue without a new connection having to be established by the transport layer protocol peers.

The link record can be arranged in any suitable or desirable way. For example, it can be a table that directly associates session level connection identifier values with transport layer connection identifier values. However, the link record may also be arranged to associate values of the session level connection identifier with a further record, e.g. via a reference or pointer to such a further record, where the further record then comprises the one or more transport layer connection identifier values to be associated with the session level connection identifier value. Such a further record can e.g. be a transport connection state record, such as a TCP socket comprising a socket structure, an Internet Protocol Control Block (InPCB) and a TCP Control Block (TCB). The advantage of having the link record establish an association to a further record is a further degree of freedom, as this further record can then be kept in a format suitable for other control purposes (e.g. for transport layer peer control) without having to modify those other control purposes, but nonetheless providing the possibility of manipulating the further record on the basis of the session level connection identifier and the link record, e.g. for changing the value of the transport layer connection identifier and possibly values of further transport layer parameters or attributes kept in the further record.

The keeping of a transport connection state record enables the flow of data between the communication device and its partner to resume exactly at the point where it was interrupted when either device suffers a change to its connection endpoint identifier (e.g. IP address).

It is preferable that the procedure for managing a communication session also uses one or more session level parameters or attributes associated with corresponding transport layer parameters or attributes, for being able to reference these transport layer parameters or attributes independently of the values of the transport layer parameters, namely using the values of the session level parameter. An example of such further session level parameters or attributes is a sequence position identifier for identifying the sequence position of a data unit in the communication session. This leads to a further degree in freedom in session management, as the session manager can refer to one or more aspects of the transport layer connection using its own mechanism, thereby allowing to influence on the values of the transport layer parameters by the session management. The use e.g. of a session level sequence position identifier not only enables the flow of data between the communication device and its partner to resume exactly at the point where it was interrupted, but makes this possible without having to rely on the recovery mechanisms provided by the transport layer protocol.

BRIEF DESCRIPTION OF FIGURES

In the following, the present invention will be explained more fully with reference to preferred embodiments and their accompanying figures, in which.

DETAILED DESCRIPTION OF EMBODIMENTS

Figure 4:
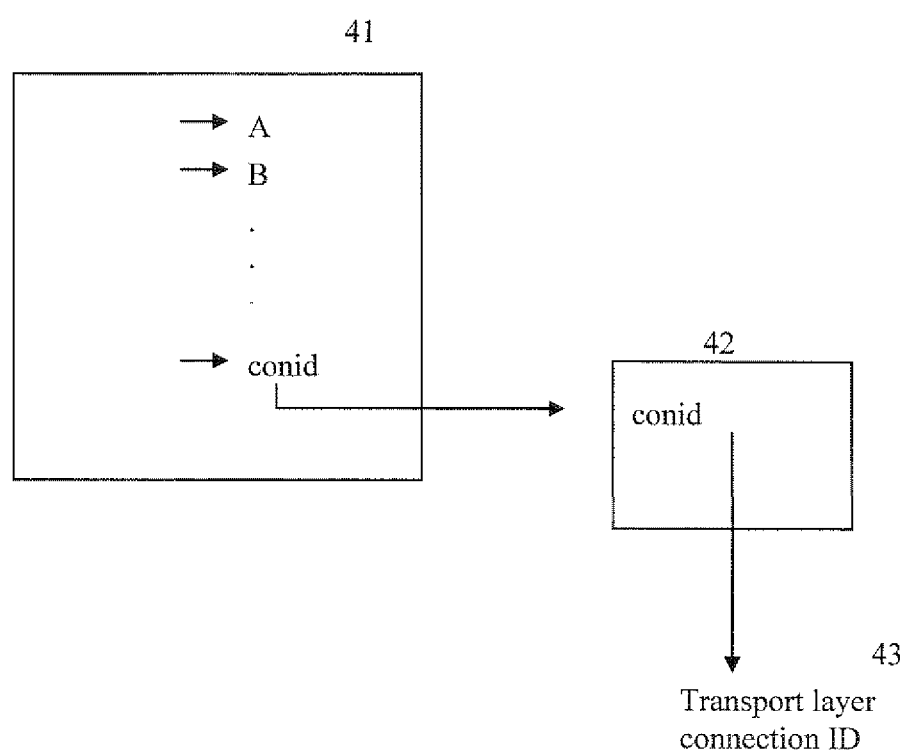
FIG. 4 shows a basic embodiment of the general concept of the present invention.

FIG. 4 shows a schematic representation of the basic concept of the present invention. Reference numeral 41 represents a session management procedure, e.g. performed by a session layer controller or an application layer control procedure. This session management procedure is done according to certain rules and using certain conventions, e.g. with the help of the Session Initiation Protocol (SIP) and the Session Description Protocol (SDP). Management procedure 41 uses a number of parameters, which may also be referred to as attributes or variables, shown as A and B. According to the invention, a further parameter is added, namely the session level connection identifier (conid). When procedure 41 invokes conid, a link reference 42 (e.g. a table) establishes an association with a recorded transport layer connection ID 43, e.g. a four-tuple of sender/receiver TCIP address and port number pairs.

As described before, by making it possible for the session manager to refer to a connection independently of the transport layer connection identifier, a new degree of freedom in session control is achieved, and it e.g. becomes possible to change the value of the transport layer connection identifier (e.g. one endpoint address of a TCP/IP address pair) while retaining the same session level connection identifier.

The values of the identifiers can be set in any suitable or desirable way. For example, the managing of the communication session may comprise establishing during session set-up an initial value of the session level connection identifier and an initial value of the transport layer connection identifier, and then recording the values appropriately in the link record. Furthermore, by virtue of the concept of the present invention, in the event of a change in value of the transport layer connection identifier, the managing of the communication session may comprise updating the recorded value of the transport layer connection identifier.

The updating may occur differently, depending on the cause of the updating. If a communication device is in communication with a partner, and the partner changes its transport layer address (e.g. IP address), then the concept of the present invention allows an updating in the communication device. This comprises receiving a message comprising a value of the session level connection identifier and a value of at least a part of said transport layer connection identifier (e.g. the IP address of the partner is a part of the four-tuple comprising the IP address and port number of the partner and the IP address and port number of the communication device under consideration), and using the recorded value and the received value of the session level connection identifier for updating the recorded value of the transport layer connection identifier based on the received value of the at least part of the transport layer connection identifier. The received message may furthermore comprise a value of a session level sequence position identifier for identifying a sequence position of a data unit in said communication session and updating a recorded value of the session level sequence position identifier based on said received value.

If the communication device under consideration itself changes the transport layer connection identifier value (e.g. receives a new address due to mobility) it may change a value of at least a part of the recorded transport layer connection identifier and send a message comprising the recorded value of the session level connection identifier and the value of at least the part of said transport layer connection identifier. This sent message can then be used by the communication partner for updating its record, as described previously. The sent message may furthermore comprise a recorded value of a session level sequence position identifier for identifying a sequence position of a data unit in the communication session.

Further details of preferred aspects of the invention will be explained in the following by referring to a specific example. Although reference will be made to specific protocols (such as SIP and SDP) and devices (such as mobile phones), these only serve as examples and the concept of the present invention can be applied within the context of any system that performs session control on the one hand and uses transport layer connection identifiers on the other.

Figure 1:
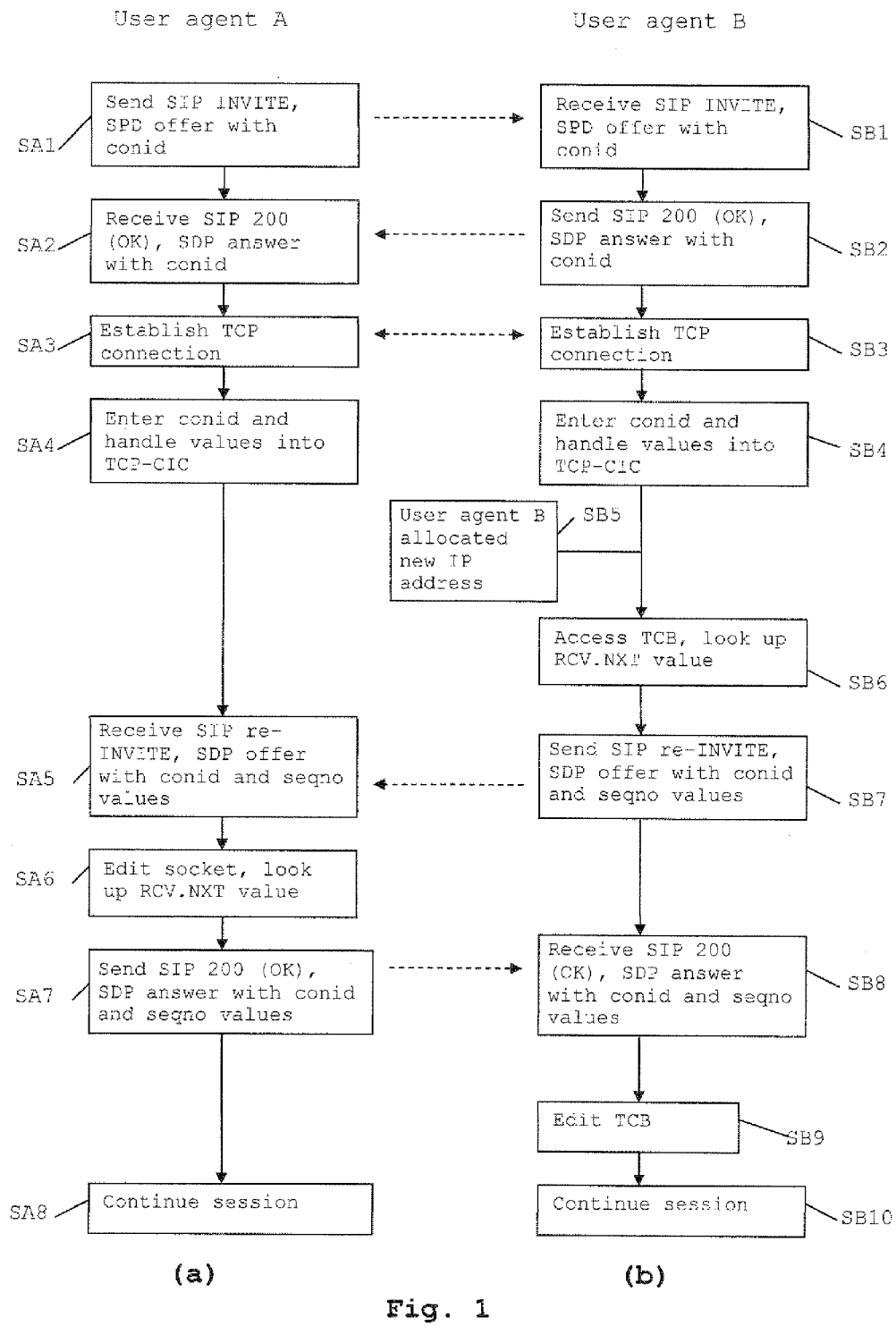
FIG. 1 shows flow diagrams according to a first embodiment (a) and a second embodiment (b) of the present invention.

FIG. 1(a) shows a procedure performed by a communication device according to an embodiment of the present invention. The communication device communicates with a communication partner through an IP-based network, e.g. the Internet. FIG. 1(b) shows the corresponding procedure performed by the partner device. The communication device hosts a user agent A and the partner device hosts a user agent B.

User agent A wishes to set up a communication session with user agent B. The session could, for example, be a multimedia teleconference, a voice-over-IP call, or multimedia distribution. Information concerning the session, such as media details (e.g. media type and format) and transport addresses, is preferably specified by each user agent in session descriptions using a defined representation, e.g. a standard representation as provided by the Session Description Protocol (SDP) (RFC 4566).

The session between the user agents may be managed, that is to say created, maintained, modified or terminated, using any suitable control and signalling protocol that acts as a carrier for SDP, for example the Session Announcement Protocol, Real Time Streaming Protocol or Hypertext Transport Protocol. However, it is preferable that the Session Initiation Protocol (SIP) (RFC 3261) is used as the session management protocol. Namely, SIP is typically used by the IP Multimedia Subsystem—an architectural framework for delivering IP multimedia to mobile users and a preferred application of the inventive concept is in the field of mobile communication.

As described in RFC 3264, SIP can use the offer/answer model with the syntax of SDP to enable the user agents to arrive at a common view of the session between them. In the present example, user agent A, acting as an offerer, generates an SDP message which constitutes an offer setting out one or more media streams and codecs the offerer wishes to use, along with the IF address and port at which the offerer wishes to receive the media. An SDP description consists of a session-level description (containing details that apply to the whole session and all media streams) and optionally several media-level descriptions (details that apply onto a single media stream). The offer is conveyed to user agent B who is the answerer.

The answerer generates an answer, which is an SDP message that responds to the offer provided by the offerer. The answer has a matching media stream for each stream in the offer, indicating whether or not the offer is accepted, along with the codecs that will be used and the IP address and port at which the answerer wishes to receive media.

Those skilled in the art will be familiar with the details of SDP, SIP, and the SDP offer/answer model, therefore a more detailed explanation thereof is unnecessary in the present specification.

The establishment of a session between user agent A and user agent B will now be described more fully with reference to FIG. 1(a). In the present embodiment, user agent A wishes, e.g. to establish a T.38 fax session with user agent B. Acting as the offerer, user agent A at IP address 192.168.1.1 will signal its intention to set up a T.38 fax connection at port 54111. This is achieved in step SA1 by sending a suitable SIP message, which is an INVITE request in the present example, with an SDP description that includes the following SDP media-level description:
m=image 54111 TCP t38
c=IP4 192.168.1.1
a=conid XXXXXX
a=setup:passive
a=connection:new Using SIP/SDP, offers and answers may appear in INVITE requests, reliable responses to INVITE requests, reliable provisional responses, reliable provisional acknowledgments (PRACK) and ACK messages.

The above exemplary media-level description contains a single media stream, which is specified by the "m=" line and its associated attributes. Naturally, more than one media stream may be specified in the offer. Alternatively, the offerer may specify no media streams, signifying that it wants to communicate but that the streams for the session will be added at a later time through a modified offer.

Firstly, it is noted that in accordance with the invention, the present embodiment uses a connection identifier (ConID) for referring to a transport connection which will be set up and used in the communication session. When sessions are described using SDP, ConID takes the form of a new parameter or attribute "conid", which may be a SDP media-level attribute, as in the present example, or a SDP session-level attribute ("SDP media-level" and "SDP session-level" refer to the context within SDP in this example, as SDP specifies these sub-levels. The "SDP session-level" is not to be confused with the generic term "session level" used otherwise in the specification and claims, which generically refers to session related control at the session or application layer).

It is noted that the ConID is conceptually different from the transport layer connection identifier, which in the present embodiment consists of the IP address and port number associated with each connection endpoint. In particular, ConID is used by session management procedures that operate on a level above the transport layer in the protocol stack (e.g. session or application layer). In other words, ConID is a session management-level identifier and acts as a useful extension to session management procedures (such as those which make use of SIP), which enhances their functionality. The advantages that flow from the use of ConID in the present embodiment will become clear from the following description.

In the present embodiment, "image" is specified as the media type, and "t38" is indicated as the media format. Of course, other media types (e.g. video, audio, application etc.) and formats could be used.

Figure 5:
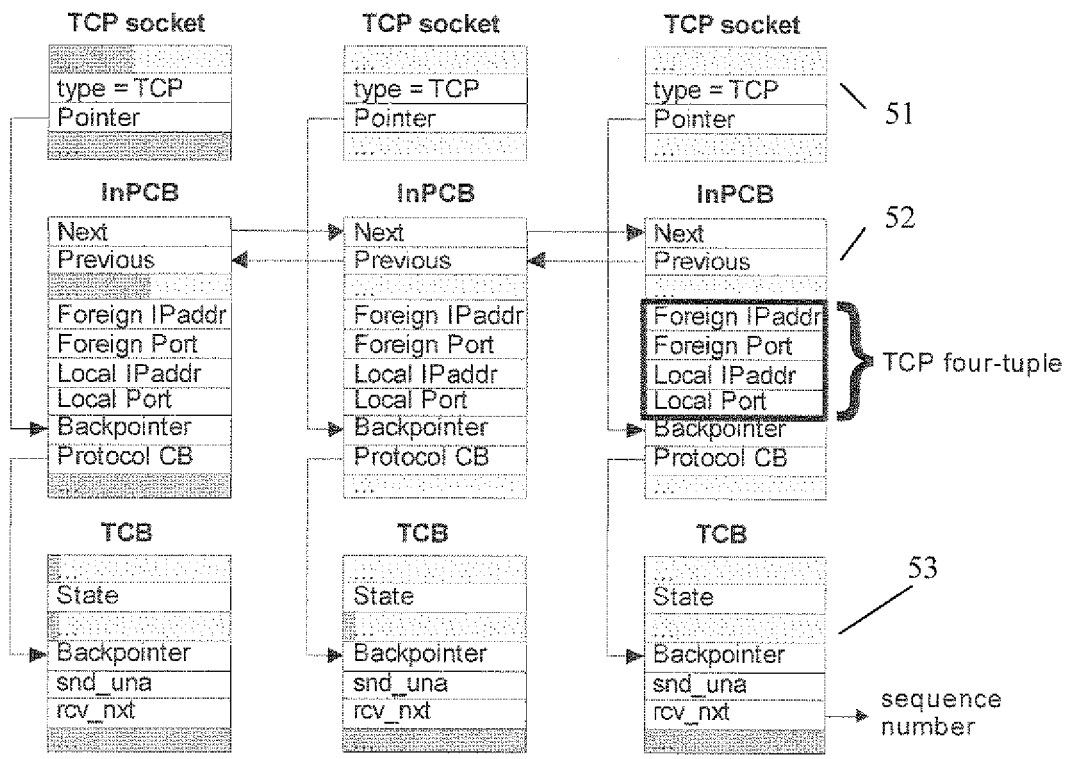
FIG. 5 shows an example of a TCP socket comprising an InPCB and a TCB.

Depending on the media type, it may be preferable to conduct a session using a reliable transport protocol, such as TCP. It is well known that TCP connection is controlled by using a special data structure known as a TCP socket, which includes information about the connection state, for example the connection status (LISTEN, SYN-SENT, ESTABLISHED etc.) and endpoint IP addresses and port numbers, and links the connection with an application. The structure of a TCP socket is shown in FIG. 5. As can be seen, a TCP socket comprises a socket structure 51 comprising a pointer towards an InPCP, which in turn comprises a pointer towards a TCB. The InPCB comprises a value of the TCP four-tuple of foreign (i.e. of the partner) IP address, foreign port number, local (i.e. of the device under consideration) IP address and local port number. This four-tuple is an example of a transport layer connection identifier. The TCB in turn stores various variables relating to the send and receive state of the connection, e.g. respective send and receive sequence numbers. For example, at the transport layer level the sender of data keeps track of the next sequence number to use with the recorded value of the variable SND.NXT, while a receiver of data keeps track of the next sequence number to expect with the recorded value of the variable RCV.NXT. It is noted that SND.NXT and RCV.NXT are transport layer parameters or attributes.

The transport connection is a TCP connection in the present embodiment. In general, other transport layer protocols can be used, reliable or unreliable. In accordance with the scheme set out in RFC 4145 for describing media transport over TCP connections using SDP, the offer from user agent A contains a "TCP" protocol identifier, a "setup" attribute and a "connection" attribute. In particular, the offer indicates that user agent A will accept an incoming connection (the setup attribute has the value "passive") and that it wants a new transport layer connection to be established (the connection attribute has the value "new").

After receiving (step SB1) the offer from user agent A, user agent B at IP address 192.168.2.2 answers, sending (see step SB2) a SIP 200 (OK) response with the following SDP media-level description:
m=image 9 TCP t38
c=IN IP4 192.168.2.2
a=conid XXXXXX
a=setup:active
a=connection:new User agent B, acting as the answerer, thus signals its intention to initiate a new outgoing connection, and a new outgoing connection using TCP port 9. User agent A receives user agent B's answer in step SA2.

As will be appreciated, in an alternative embodiment, the offerer could offer to initiate a new outgoing connection by specifying a value of "active" for the setup attribute and a value of "new" for the connection attribute, and specify port 9 in the offer. In that case, the answerer could accept the offer by specifying a value of "passive" for the setup attribute and a value of "new" for the connection attribute.

In the present embodiment a link record, which associates the session management-level identifier ConID with a transport layer connection identifier, is kept at each session endpoint in the form of a record called a TCP Connection Identification Cache (TCP-CIC).

FIG. 2(a) shows a representation of a TCP-CIC in the form of a TCP-CIC table (200), in which a conid value may be recorded in a row of a "conid" column (201). This entry may be associated with a so-called connection handle (e.g. a network socket) by entering a value for the connection handle in the corresponding row of a "Connection handle" column (202). The connection handle acts as a link or pointer to the state information of the TCP/IP connection kept at the session endpoint where the TCP-CIC is kept, i.e. like a "handle" for opening an appropriate drawer. In the case of the TCP/IP this state record can be a TCP socket as shown in FIG. 5. This link enables the user agent at a session endpoint to maintain the session by accessing and updating contents of the corresponding InPCB, such as the IP addresses and port numbers constituting the transport layer connection identifier. Other TCP options associated with a particular conid value are optionally specified in the corresponding row of a third column (203). Examples of such further options are shown in FIG. 2(c), in which "Availability" e.g. indicates the availability of this connection to be used by an application, "Owner" may indicate an owner application or process, and "Other" might be any other property that is worth knowing about before looking into the socket. "Index" can e.g. be any value that can be used to categorize conid entries. In other words, the index option can be used to group several conids, i.e. a value of the parameter "index" refers to a group of conids.

The table shown in FIG. 2(a) contains two available rows, one for each connection. Naturally, more than two connections may be used in a session, in which case the TCP-CIC table has the corresponding number of rows.

After a successful completion of the offer/answer exchange, a transport connection is negotiated by the TCP peers in steps SA3 and SB3, each of which creates and subsequently maintains its own InPCB and TCB associated with the connection. In the present example, the TCP peer at the communication device hosting user agent B initiates connection establishment by sending a SYN segment, i.e. a synchronisation message. However, connection establishment could alternatively be initiated by the TCP peer at the communication device hosting user agent A. The session may then proceed, with the fax data being sent from user agent B to user agent A. It is noted that for purposes of simplicity the exchange of content is not shown in FIG. 1.

Referring now again to FIG. 1(a), in step SA4, user agent A registers the conid attribute value of "XXXXXX" in its TCP-CIC and associates with this conid value a connection handle for the TCP socket (InPCB and TCB) kept at its end of the connection. As an example, FIG. 2(b) shows a representation of the TCP-CIC of user agent A after the conid and connection handle values, "XXXXXX" and "Handle 1", have been entered. Similarly, in step SB4 user agent B registers the conid attribute value of "XXXXXX" in its TCP-CIC and associates with this conid value a connection handle for the TCP socket kept at its end of the connection.

The IP address and/or port number associated with one or both of the user agents may change during the course of the session. In the present example, user agent B has its IP address changed from 192.168.2.2 to 192.168.3.3 at a point SB5. This would occur, for example, if the communication device hosting user agent B moves to a new location and is assigned a new IP address. This can e.g. occur if the host is in a mobile phone, and the mobile phone is handed off to a new base station.

User agent B proceeds by assuming the role of the offerer and sends a SIP re-INVITE request (see step SB7) with the following SDP media-level description to user agent A:
m=image 54111 TCP t38
c=IN IP4 192.168.3.3
a=conid XXXXXX
a=seqno 5678912345

Thus, user agent B communicates both its new IP address and the value "XXXXXX" of the "conid" attribute to user agent A.

It is preferable to use, as is contemplated in the present embodiment, a session level sequence position identifier (SeqID) for identifying the sequence position of a data unit sent or received by the communication device hosting a user agent. When sessions are described using SDP, SeqID takes the form of a new session level attribute "seqno", which may be an SOP media-level attribute, as in the present example, or an SDP session-level attribute.

It is noted that the SeqID is conceptually different, from the sequence number used by TCP on the transport layer. Similar to ConID, SeqID is used by session management procedures that operate on a level above the transport layer in the protocol stack (e.g. session or application layer). In other words, SeqID is a session level identifier and acts as a useful extension to session management procedures, which enhances their functionality. The advantages that flow from the use of SeqID in the present embodiment will become clear from the following description of an example.

Before sending its offer in SB7, user agent B uses the known conid value of "XXXXXX" together with its TCP-CIC to access the socket and thus the TCB kept at its end of the connection. This is the TCB which was created when the connection between the user agents was established in step SA3, as described above. User agent B then determines the value of a suitable sequence number variable kept in the TOE. In this example, the variable is RCV.NXT and its value is the sequence number of the data unit user agent B expects to receive next. The value of this sequence number, which is 5678912345 in the present example, is then assigned as a value to the "seqno" attribute.

User agent A receives the offer from user agent B in step SA5. Using the value of the "conid" attribute communicated in the offer, user agent A uses its TCP-CIC to access the socket and thereby the InPCB and/or TCB kept at its end of the connection. This is the socket which was created when the connection between the user agents was established in step SA3, as described above. User agent A then edits the socket kept at its end in step SA6, replacing the entry for the original IP address of user agent B (i.e. 192.168.2.2) with the new address communicated by user agent B in its offer (i.e. 192.168.3.3).

Having received the offer from user agent B, user agent A answers user agent B in step SA7, sending a SIP 200 (OK) response with the following SDP media-level description:
m=image 54111 t38
c=IN TP4 192.168.1.1
a=conid XXXXXX
a=seqno 5678909876

In step SA8, user agent A continues its participation in the session, receiving further data units from user agent B. In an alternative embodiment, user agent A edits its TCP-CIC after sending its answer to user agent B—in other words, steps SA6 and SA7 can be interchanged.

User agent B receives this message in SB8 and proceeds to accordingly edit its socket in step SB9, and continues with the session thereafter (see SB10).

It will be appreciated that the above-described embodiment has the advantage that when a connection-oriented transport protocol is used to support a communication session, the session can be maintained when the IP address and/or port number (as an example of a transmission layer connection identifier) of one of the user agents changes without having to establish a new connection. Delays caused by establishing a new connection (using, for example, TCP's 3-way handshake) and creating records to store the new connection endpoint identifiers are thus avoided. In the preferred embodiment, each user agent is able to simply update an IP address or port number in its existing TCB using its link record and the shared session management-level identifier.

As noted above, in the present embodiment, a reliable TCP connection is established between the user agents and a connection state record is maintained at each session endpoint in the form of a TCP.

Although it is preferable to use the session management-level sequence position identifier (SeqID), as in the present embodiment, this is not necessary for the purpose of acquiring advantages provided by the present invention, neither in general nor in the specific embodiment described above. In an alternative embodiment, the "seqno" attribute is omitted from the description accompanying the SIP re-INVITE request sent by user agent B in SB7, and the answer thereto sent by user agent A in step SA7. In this case, once the offer/answer exchange following the change in user agent B's IP address has been completed, the TCP peers can use the well-known recovery mechanisms of TCP to acquire a common perspective regarding the state of the TCP communication. In other words, the TCP peers are able to account and compensate for the data units that have not been delivered as a consequence of user agent B's address change. The further advantage provided by the use of a transport connection state record (e.g. socket) together with ConID and the link record is that the flow of data units can be made to resume exactly at the point where it was interrupted by the address change.

However, as noted above, further advantage may be derived by the use of the sequence position identifier SeqID. With reference to step SA6, it is noted that in addition to editing the InPCP and/or TCB at its end of the connection, user agent A also determines the sequence number of the data unit it expects to receive next from the value of the variable RCV.NXT kept in the TCB. The value of this sequence number, which is "5678909876" in the present example, is then assigned to the "seqno" attribute and communicated to user agent B in step SA7.

Once user agent B has received the answer sent by user agent A in step SA7, it uses the known conid value of "XXXXXX" together with its TCP-CIO to access the TCB kept at its end of the connection. This is the TCB which was created when the connection between the user agents was established in step SA3, as described above. Using the value "5678909876" of the "seqno" attribute communicated in user agent A's answer, user agent B updates the value of the "SND.NXT" variable kept in its TCB. User agent B is then able to resume its transmission of data units exactly from the point at which the flow of data units was interrupted as a consequence of user agent B's IP address change. However, in contrast to the case where no sequence position identifier SeqID is used by the user agents, the present embodiment has the advantage of enabling the flow of data units to resume exactly at the point where it was interrupted by the address change without having to rely on the aforementioned recovery mechanisms used by the transport protocol. The recovery mechanisms provided by TCP are passive in nature since they are triggered by timeouts, causing additional data overhead and significant delay.

As already mentioned previously, the introduction of a session level attribute or parameter "seqno" corresponding to the transport layer parameter "snd.nxt" is only an example, and in general the procedure for managing a communication session may alternatively or additionally use one or more session level parameters or attributes associated with corresponding transport layer parameters or attributes, for being able to reference these transport layer parameters or attributes independently of the values of the transport layer parameters. A non-exhaustive list of examples of transport layer parameters for which corresponding session level parameters can be introduced are:

t_state: it represents the current state of the TCP connection (listening, established, closing, etc.). A representation of the t_state at the session layer would enable an application to overview or modify the state of a TCP connection.

t_rtxcur: it represents the current value of the TCP retransmission timeout. A representation of t_rtxcur at the session layer would enable an application to modify the timeout value. This would be useful for enforcing or suspending a timeout.

t_maxseg: it is used to contain the maximum TCP segment. A representation of t_maxseg at the session layer would enable an application to regulate the maximum TCP segment size.

snd_cwnd: it represents the amount of data that a TCP endpoint may transmit without receiving an acknowledgement. This parameter is used to regulate the data load offered by a TCP endpoint. A representation of the snd_cwnd at the session layer would enable an application to affect the offered load.

snd_ssthresh: it contains the slow-start threshold. The congestion avoidance algorithms are used to control the value of sod cwnd. Depending on whether the value of sod cwnd supersedes that of snd_ssthresh or not, a different congestion avoidance algorithm is used. A session level representation of the snd_ssthresh at the session layer would enable an application to influence the rate by which snd_cwnd is increased.

An embodiment of the present invention has been described with reference to FIG. 1(a), which illustrates the procedure performed by the communication device hosting user agent A. However, it will be appreciated from the foregoing description that the aspects of the present invention are also embodied in the procedure performed by the communication partner hosting user agent B, which constitutes a second embodiment.

In the examples discussed above, only one conid value referred to as "XXXXXX" was mentioned. According to a preferred embodiment, it is possible to provide the control method and corresponding communication device with a mechanism for identifying groups of conids. This makes session management more efficient in such cases in which a communication partner (e.g. a mobile network router) acts as an endpoint for multiple TCP based-media. By being able to identify groups of conids, it is possible to address whole groups of conids in an offer/answer model (e.g. like in SDP) without having to include a could entry for each one in the message. This can be done in any suitable or desirable way. For example, a new session level attribute such "index" mentioned in connection with FIG. 2(c) can be introduced, where the value of "index" identifies a number of conids kept in a separate record referenced by the index value, or the format and syntax of the conid itself can be appropriately chosen. For example, one could use wildcards (e.g. the character "*", "?") in one conid value included in messages such as SDP offers and answers, to thereby address all conids having the remaining characters in common. Alternatively or additionally, the format of the conids can be chosen in such a way that e.g. a complete conid value is defined by n characters (n being an integer), and if a message comprises less than n characters in the conid field, then the receiving user agent will interpret these characters as the first or last characters of a conid, and select a group of all those conids having this conid part in common.

Figures 2, 3:
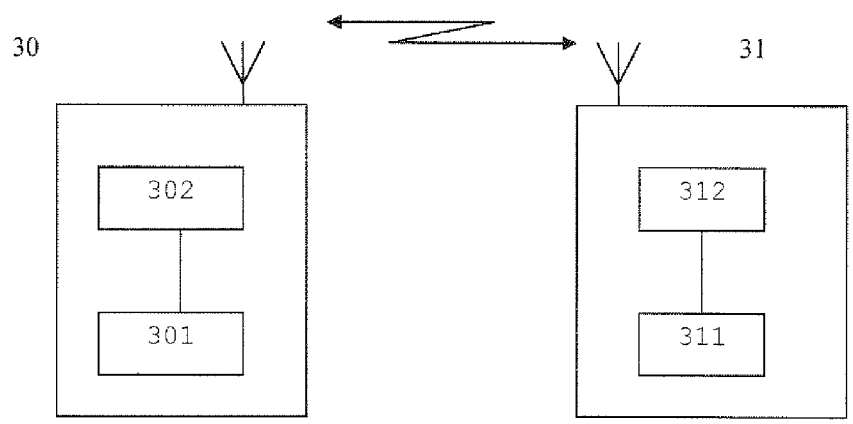
FIG. 2 schematically shows representations of a TCP Connection Identification Cache which are useful for understanding the present invention.
FIG. 3 schematically shows communication devices according to a third embodiment of the present invention.

The present invention can furthermore be embodied as a communication device 30 for communicating with a partner communication device 31, as shown in FIG. 3. The communication device 30 can, for example, be a wireless terminal such as a Personal Digital Assistant (PDA), mobile telephone or portable computer, and the communication partner a corresponding base station. Alternatively, the device 30 can be a base station and the partner device 31 a mobile terminal.

The communication device 30 of FIG. 3 comprises a control system that can be provided, for example, by a processor or controller 301 and a memory 302. The communication device 30 also comprises further conventional elements of a communication device, which are well-known to the skilled person, such that a detailed description is not necessary. The control system 301, 302 is arranged for sending a data unit to and/or receiving a data unit the partner communication device 31. The control system of communication device 30 is configured to perform a procedure for managing a communication session with the communication partner 31 using a session level connection identifier for referring to a transport connection used in the communication session, and a procedure for keeping a link record associating a recorded value of said identifier with a a recorded value of a transport layer connection identifier. It is preferable that the control system further be configured to perform a procedure for keeping a transport connection state record comprising the transport layer connection identifier. It is also preferable that the procedure for managing a communication session uses a session level sequence position identifier for identifying the sequence position of a data unit sent or received by the communication device.

The control system can be implemented in any suitable or desirable way, as hardware, software or any suitable combination of hardware and software. It is furthermore noted that the present invention can also be embodied as a computer program that executes one of the above described methods of controlling a communication device when loaded into and run on a programmable communication device, and as a computer program product, e.g. a data carrier storing such a computer program.

Although the present invention has been described on the basis of detailed and preferred embodiments, these only serve to illustrate the invention and are not intended to be limiting. The scope of protection is defined by the appended claims.

The invention claimed is:

1. A method, in an Internet Protocol network, of controlling a communication device comprising:

managing a communication session with a communication partner using a session level connection identifier for referring to a transport connection used in said communication session, where the session level connection identifier is independent of a transport layer connection identifier so a value of the transport layer connection identifier can be changed while retaining the session level connection identifier so a session manager can continue to handle the communication session as occurring on a same connection, although conditions at the transport layer have changed, thereby allowing a change of IP address of the communication device on the session level without having to modify procedures at the transport layer; and keeping a link record associating a recorded value of said session level connection identifier with a recorded value of a transport layer connection identifier.

2. The method according to claim 1, wherein said link record associates said recorded value of said session level connection identifier with a record comprising said recorded value of said transport layer connection identifier.

3. The method according to claim 2, wherein said record comprising said recorded value of said transport layer connection identifier is a transport connection state record.

4. The method according to claim 1, wherein said managing of said communication session includes using one or more session level parameters associated with corresponding transport layer parameters, for referencing values of said transport layer parameters.

5. The method according to claim 4, wherein said one or more session level parameters comprise a session level sequence position identifier for identifying a sequence position of a data unit in said communication session.

6. The method according to claim 1, wherein said managing of said communication session comprises establishing during session set-up an initial value of said session level connection identifier and an initial value of said transport layer connection identifier, and recording said values.

7. The method according to claim 1, where in the event of a change in value of said transport layer connection identifier, said managing of said communication session comprises updating said recorded value of said transport layer connection identifier.

8. The method according to claim 7, comprising receiving a message comprising a value of said session level connection identifier and a value of at least a part of said transport layer connection identifier, and using said recorded value and said received value of said session level connection identifier for updating said recorded value of said transport layer connection identifier based on said received value of said at least part of said transport layer connection identifier.

9. The method according to claim 8, wherein said received message furthermore comprises a value of a session level sequence position identifier for identifying a sequence position of a data unit sent in said communication session and updating a recorded value of said session level sequence position identifier based on said received value.

10. The method according to claim 7, comprising changing a value of at least a part of said transport layer connection identifier and sending a message comprising the recorded value of said session level connection identifier and said value of at least said part of said transport layer connection identifier.

11. The method according to claim 10, wherein said sent message furthermore comprises a recorded value of a session level sequence position identifier for identifying a sequence position of a data unit sent in said communication session.

12. The method according to claim 1, wherein the control method is provided with a mechanism for identifying groups of values of said session level connection identifier.

13. The method according to claim 1, wherein said managing of said communication session comprises processing session parameters using the Session Description Protocol.

14. The method according to claim 1, wherein said managing said communication session comprises communicating session parameters using the Session Initiation Protocol.

15. The method according to claim 1, wherein the transport connection is a TCP/IP connection.

16. A communication device comprising a controller and a memory, said controller being arranged for managing a communication session, in an Internet Protocol network, with a communication partner using a session level connection identifier for referring to a transport connection used in said communication session, where the session level connection identifier is independent of a transport layer connection identifier so a value of the transport layer connection identifier can be changed while retaining the session level connection identifier so a session manager can continue to handle the communication session as occurring on a same connection, although conditions at the transport layer have changed, thereby allowing a change of IP address of the communication device on the session level without having to modify procedures at the transport layer, and for keeping a link record in said memory for associating a recorded value of said session level connection identifier with a recorded value of a transport layer connection identifier.

17. The communication device according to claim 16, wherein said link record associates said recorded value of said session level connection identifier with a record comprising said recorded value of said transport layer connection identifier.

18. The communication device according to claim 17, wherein said record comprising said recorded value of said transport layer connection identifier is a transport connection state record.

19. The communication device according to claim 16, wherein said controller is furthermore arranged for using one or more session level parameters associated with corresponding transport layer parameters, for referencing values of said transport layer parameters.

20. The communication device according to claim 19, wherein said one or more session level parameters comprise a session level sequence position identifier for identifying a sequence position of a data unit sent in said communication session.

21. The communication device according to claim 16, wherein said controller is furthermore arranged for establishing during session set-up an initial value of said session level connection identifier and an initial value of said transport layer connection identifier, and recording said values in said memory.

22. The communication device according to claim 16, where said controller is furthermore arranged for updating said recorded value of said transport layer connection Identifier in the event of a change in value of said transport layer connection identifier.

23. The communication device according to claim 22, wherein said controller Is furthermore arranged for receiving a message comprising a value of said session level connection identifier and a value of at least a part of said transport layer connection identifier, and using said recorded value and said received value of said session level connection identifier for updating said recorded value of said transport layer connection identifier based on said received value of said at least part of said transport layer connection identifier.

24. The communication device according to claim 23, wherein said received message furthermore comprises a value of a session level sequence position identifier for identifying a sequence position of a data unit sent in said communication session and said controller is arranged for updating a recorded value of said session level sequence position identifier based on said received value.

25. The communication device according to claim 22, wherein said controller is arranged for changing a value of at least a part of said transport layer connection identifier and sending a message comprising the recorded value of said session level connection identifier and said value of at least said part of said transport layer connection identifier.

26. The communication device according to claim 25, wherein said sent message furthermore comprises a recorded value of a session level sequence position identifier for identifying a sequence position of a data unit sent in said communication session.

27. The communication device according to claim 16, said device being arranged for identifying groups of values of said session level connection identifier.

28. The communication device according to claim 16, wherein said controller is arranged for processing session parameters using the Session Description Protocol.

29. The communication device according to claim 16, wherein controller is arranged for communicating session parameters using the Session Initiation Protocol.

30. The communication device according to claim 16, wherein the transport connection is a TCP/IP connection.

* * * * *